US012465174B2

(12) United States Patent
McGaha et al.

(10) Patent No.: US 12,465,174 B2
(45) Date of Patent: Nov. 11, 2025

(54) OVEN FOR HEATING FOOD

(71) Applicant: Duke Manufacturing Co., St. Louis, MO (US)

(72) Inventors: Michael McGaha, St. Louis, MO (US); Dean Meyer, St. Louis, MO (US); Alyssa DeGreeff, St. Louis, MO (US); Tom Rand, St. Louis, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 1107 days.

(21) Appl. No.: 17/216,783

(22) Filed: Mar. 30, 2021

(65) Prior Publication Data

US 2021/0298529 A1 Sep. 30, 2021

Related U.S. Application Data

(60) Provisional application No. 63/003,077, filed on Mar. 31, 2020.

(51) Int. Cl.
*A47J 39/00* (2006.01)
*A47J 36/24* (2006.01)

(52) U.S. Cl.
CPC ......... *A47J 39/003* (2013.01); *A47J 36/2483* (2013.01); *A47J 39/006* (2013.01)

(58) Field of Classification Search
CPC .... A47J 39/003; A47J 36/2483; A47J 39/006; F23B 50/12
USPC .......... 99/473, 474, 483; 392/347, 356, 368, 392/382
See application file for complete search history.

(56) References Cited

U.S. PATENT DOCUMENTS

| 2,111,148 A * | 3/1938 | Judelson | D06F 58/10 219/400 |
| 4,499,818 A | 2/1985 | Strong | |
| 8,437,627 B1 * | 5/2013 | Magner | A47J 36/24 392/382 |

(Continued)

FOREIGN PATENT DOCUMENTS

WO WO-2015189788 A1 * 12/2015 .............. A47J 36/24

OTHER PUBLICATIONS

BKI Fried Food Warmers Series UW Operation Manual dated Oct. 16, 2018, 15 pages.

(Continued)

*Primary Examiner* — Edward F Landrum
*Assistant Examiner* — Thomas J Ward
(74) *Attorney, Agent, or Firm* — Stinson LLP

(57) ABSTRACT

An oven for heating food and associated components and methods. The oven includes a food heating compartment bounding a food holding space for holding food to be heated. The food holding space has an open top. A bottom wall of the food heating compartment supports food in the food holding space and has gas flow inlets. A gas supply plenum is disposed below the food holding space and is in fluid communication with the food holding space via the gas flow inlets. A gas supply duct defines a gas supply passageway disposed below and fluidly coupled to the gas supply plenum. A heater heats the gas as the gas flows through the gas supply passageway. A blower blows the gas through the gas supply passageway, into the gas supply plenum and through the gas flow inlets into the food holding space for heating the food.

33 Claims, 9 Drawing Sheets

(56) References Cited

U.S. PATENT DOCUMENTS

2014/0116268 A1* 5/2014 Bigott .................. A47J 39/003
99/483
2017/0079473 A1 3/2017 Bigott

OTHER PUBLICATIONS

Merco Parts & Service Manual—Fried Food Holding Station 27000 Series dated Dec. 10, 2009, 40 pages.
Manual on Pitco Model PCC14, PCC18 and PCC28 Crisp N' Hold Food Station (Forced Hot Air Holding System) dated Apr. 2015, 2 pages.
Installation, Operation and Maintenance Manual for Merco Fried Food Holding Station FFHS Series dated Aug. 2018, 12 pages.
Manual for Carter-Hoffmann CNH Series Crisp 'N Hold Crispy Food Stations (with forced air heating system), 2 pages.
Service Manual for Chick-fil-a Fry Warmer (Serial Nos. 120182 and Higher) dated Feb. 25, 2013, 25 pages.
Operator's Manual for Meister Cook Fried Food Holder FH 23-Series dated Sep. 2009, 14 pages.
Bid Specification Pamphlet on Merco Fried Food Holding Station dated Oct. 2009, 4 pages.
Specification Pamphlet on BKI Hot-N Crispy Fry Warmer Model UW-17 dated Feb. 2007, 2 pages.

\* cited by examiner

OVEN FOR HEATING FOOD

CROSS-REFERENCE TO RELATED APPLICATION

This application claims the benefit of U.S. Provisional Application No. 63/003,077, filed Mar. 31, 2020, the entirety of which is hereby incorporated by reference.

FIELD

The present disclosure generally relates to food serving equipment, and more particularly to an oven for heating food.

BACKGROUND

This disclosure is directed to an oven that uses hot gas to maintain pre-cooked food at proper temperatures before serving. This type of equipment is often referred to using such names as holding oven, holding unit, or food warmer. Such equipment is used in the fast food service industry to heat food or maintain cooked food at a desired temperature prior to serving it.

SUMMARY

In one aspect, an oven for heating food comprises a food heating compartment bounding a food holding space sized and shaped to receive the food to be heated. The food heating compartment has opposite first and second side walls and a bottom wall having a bottom wall forward portion and a bottom wall rearward portion. The food holding space has an open top in open communication with a surrounding environment outside the oven. The bottom wall has a plurality of gas flow inlets and defines a food support surface for supporting food in the food holding space. A gas supply plenum is disposed below the food holding space and is in fluid communication with the food holding space via the plurality of gas flow inlets. The gas supply plenum includes a gas supply plenum forward portion below the bottom wall forward portion and includes a gas supply plenum rearward portion below the bottom wall rearward portion. A gas supply duct defines a gas supply passageway disposed below the gas supply plenum. The gas supply passageway fluidly couples to and upstream from the gas supply plenum. A heater is configured to heat the gas. A blower is configured to blow the gas through the gas supply passageway into the gas supply plenum and through the plurality of gas flow inlets into the food holding space.

In another aspect, an oven for heating food comprises a food heating compartment bounding a food holding space sized and shaped for receiving the food to be heated. The food heating compartment has opposite first and second side walls and a bottom wall having a bottom wall forward portion and a bottom wall rearward portion. The food holding space has an open top in open communication with a surrounding environment outside the oven. The bottom wall has a plurality of gas flow inlets and defines a food support surface for supporting food in the food holding space. A gas supply plenum is disposed below the food holding space and is in fluid communication with the food holding space via the plurality of gas flow inlets. The gas supply plenum has a gas supply plenum forward portion below the bottom wall forward portion and has a gas supply plenum rearward portion below the bottom wall rearward portion. The gas supply plenum rearward portion being downstream from the gas supply plenum forward portion. A gas supply duct defines a gas supply passageway. The gas supply duct has an outlet out of which gas flows from the gas supply passageway into the gas supply plenum forward portion. A heater is configured to heat the gas. A blower is configured to blow the gas through the gas supply passageway into the gas supply plenum forward portion, from the gas supply plenum forward portion into the gas supply plenum rearward portion, and from the gas supply plenum through the plurality of gas flow inlets into the food holding space.

In another aspect, an oven for heating food comprises a food heating compartment bounding a food holding space sized and shaped for receiving the food. The food heating compartment has a plurality of gas flow inlets. The food holding space has an open top in open communication with a surrounding environment outside the oven. A gas supply duct defines a gas supply passageway fluidly coupled to the plurality of gas flow inlets. A heater is configured to heat the gas. The heater includes at least one heating element disposed in the gas supply passageway and is configured to heat the gas flowing through the gas supply passageway. A blower is configured to blow the gas through the gas supply passageway and the plurality of gas flow inlets into the food holding space. A heat shield is disposed in the gas supply passageway, upstream of the at least one heating element and downstream of the blower. The heat shield is configured to inhibit a direct line of sight between the at least one heating element and the blower.

In another aspect, an oven for heating food comprises a food heating compartment bounding a food holding space sized and shaped for receiving the food to be heated. The heating compartment has a plurality of gas flow inlets. The food holding space has an open top in open communication with a surrounding environment outside the oven. A gas supply duct defines a gas supply passageway fluidly coupled to the plurality of gas flow inlets. The gas supply passageway having a central axis extending along a length of the gas supply passageway. A heater is configured to heat the gas. The heater includes multiple heating element segments disposed in the gas supply passageway and is configured to heat the gas flowing through the gas flow passageway. The heating element segments extend widthwise with respect to the gas supply passageway and are spaced different distances from the central axis of the gas supply passageway at different locations along the length of the gas supply passageway. A blower is configured to blow the gas through the gas supply passageway, past the heating element segments, through the plurality of gas flow inlets, and into the food holding space.

In another aspect an oven for heating food comprises a food heating compartment having a food holding space sized and shaped for receiving the food to be heated. The food heating compartment has opposite first and second side walls and a bottom wall. The bottom wall has a bottom wall forward portion, a bottom wall rearward portion, and a bottom wall valley portion therebetween. The food holding space has an open top in open communication with a surrounding environment outside the oven. The first and second side walls and the bottom wall bound the food receiving space. The bottom wall has a plurality of gas flow inlets and defines a food support surface for supporting food in the food holding space. A gas supply plenum is disposed below the bottom wall and is in fluid communication with the plurality of gas flow inlets. A heater is configured to heat the gas. A blower is configured to blow the gas through the gas supply plenum and the plurality of gas flow inlets into the heating compartment. The bottom wall forward portion includes a first perforated area including a first group of the gas flow inlets. The bottom wall rearward portion includes a second perforated area including a second group of the gas flow inlets. The bottom wall valley portion includes a third perforated area including a third group of the gas flow inlets. The first group of gas flow inlets provide the first perforated area with a first percentage of cumulative gas flow area per area of the first perforated area. The second group of gas flow inlets provide the second perforated area with a second percentage of cumulative gas flow area per area of the second perforated area. The third group of gas flow inlets provide the third perforated area with a third percentage of cumulative gas flow area per area of the third perforated area. The third percentage is less than the first percentage.

In another aspect, an oven for heating food comprises a food heating compartment bounding a food holding space sized and shaped for receiving the food. The food heating compartment has a plurality of gas flow inlets. The food holding space has an open top in open communication with a surrounding environment outside the oven. A gas supply duct defines a gas supply passageway fluidly coupled to the plurality of gas flow inlets. A heater is configured to heat the gas. The heater includes at least one heating element disposed in the gas supply passageway and is configured to heat the gas flowing through the gas supply passageway. A blower is configured to blow the gas through the gas supply passageway and the plurality of gas flow inlets into the food holding space. At least one baffle is in the gas supply passageway, upstream of the at least one heating element and downstream of the blower. The at least one baffle is configured to create an eddy in the gas flowing down the gas supply passageway to cause turbulent gas flow in the gas flow passageway to increase efficiency of heat transfer from the at least one heating element to the gas flowing past the at least one heating element.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
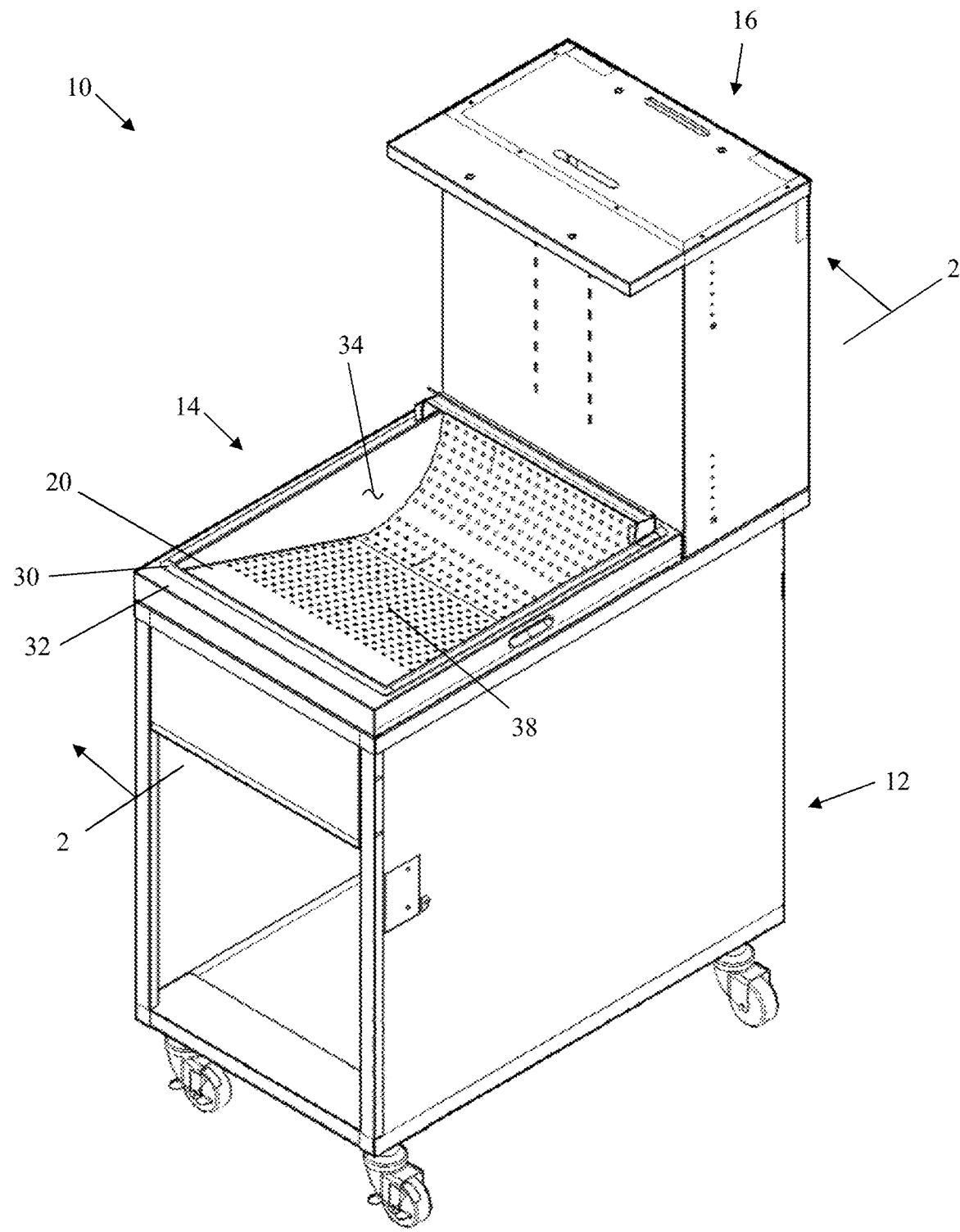
FIG. 1 is a perspective of an oven according to one embodiment of the present disclosure.

Referring to FIGS. 1-5, an oven according to one embodiment of the present disclosure is generally indicated by reference numeral 10. The oven 10 is configured for heating food with heated gas (e.g., air). For example, the oven 10 may be referred to as a food holding oven for maintaining cooked food in a warm condition before it is served. The oven 10 may be used for heating various types of food, such as potato fries, onion rings, and other fried foods or non-fried foods.

The oven 10 includes a cabinet, generally indicated at 12, supporting a food heating unit, generally indicated at 14, and an accessory cabinet, generally indicated at 16. The accessory cabinet 16 is generally disposed behind or rearward of the food heating unit 14 and may be used to support or store any type of accessory. The food heating unit 14 may be removable from the cabinet 12. Moreover, in other embodiments, a food heating unit 14 may be used to retrofit an existing cabinet to form an oven including the heating unit and cabinet, such as by installing the heating unit into an opening in the existing cabinet.

The food heating unit 14 of the oven 10 includes a food support or holder 20, a gas supply plenum 22, a gas supply duct 24, a heater 26 and a blower 28. In general, and as will be described in further detail below, heated gas is delivered (along arrows indicated at F) to food supported on the food support 20 by the blower 28 blowing the gas through the gas supply duct 24, past the heater 26, through the gas supply plenum 22 and into contact with the food on the food support. The various components of the oven 10 will be described in further detail below.

Figure 6:
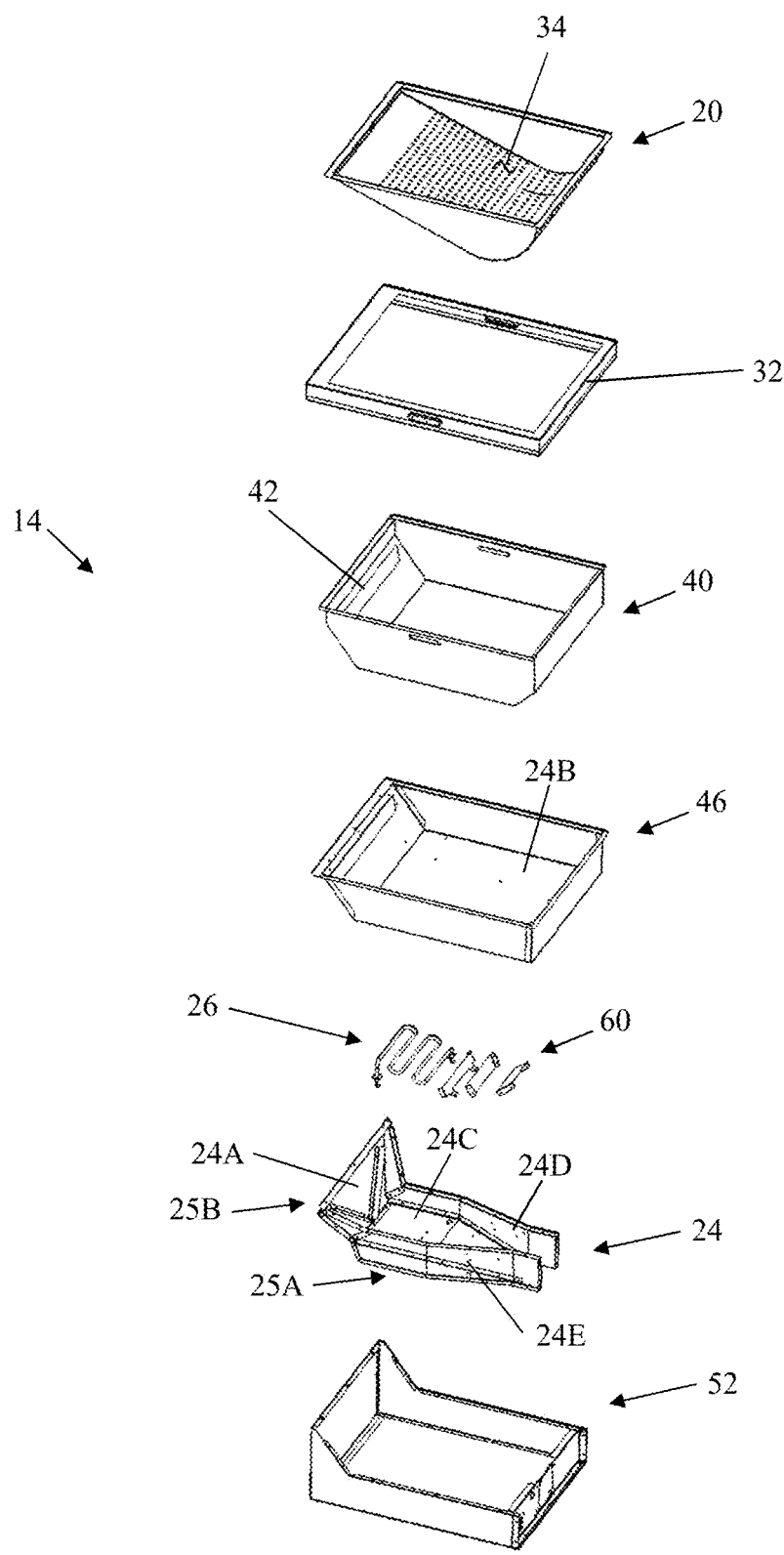
FIG. 6 is an exploded perspective of a food heating unit of the oven.
Figure 7:
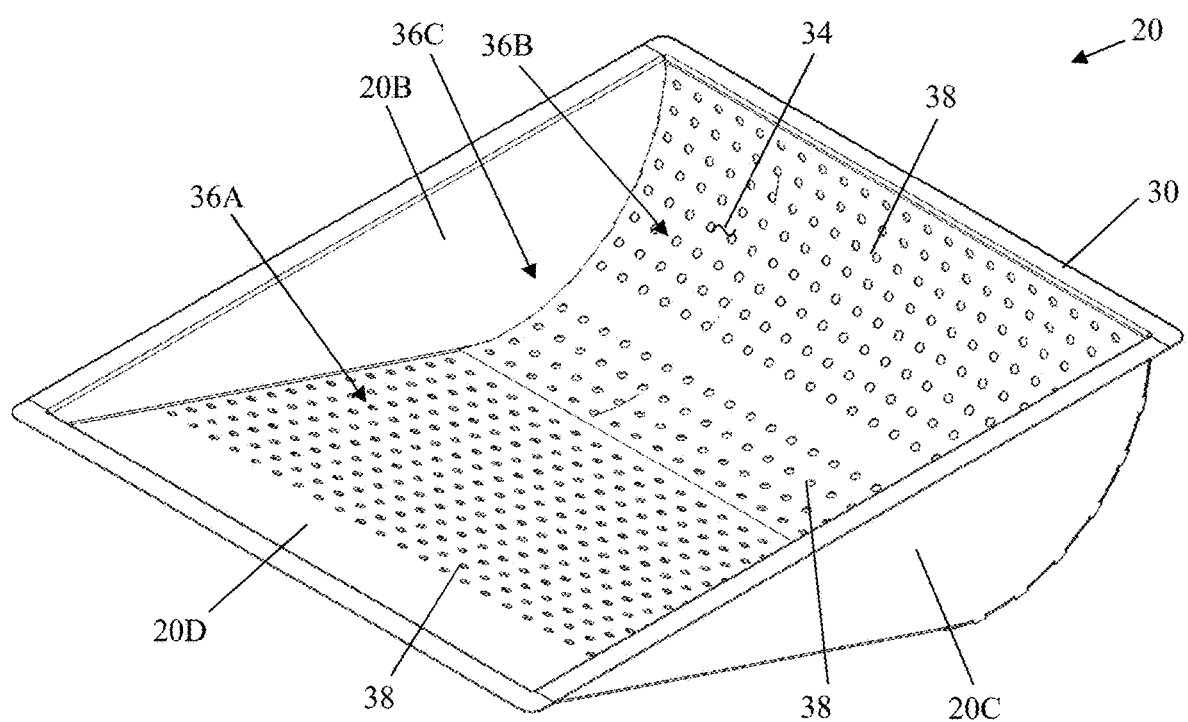
FIG. 7 is a perspective of a heating tray of the oven.
Figure 8:
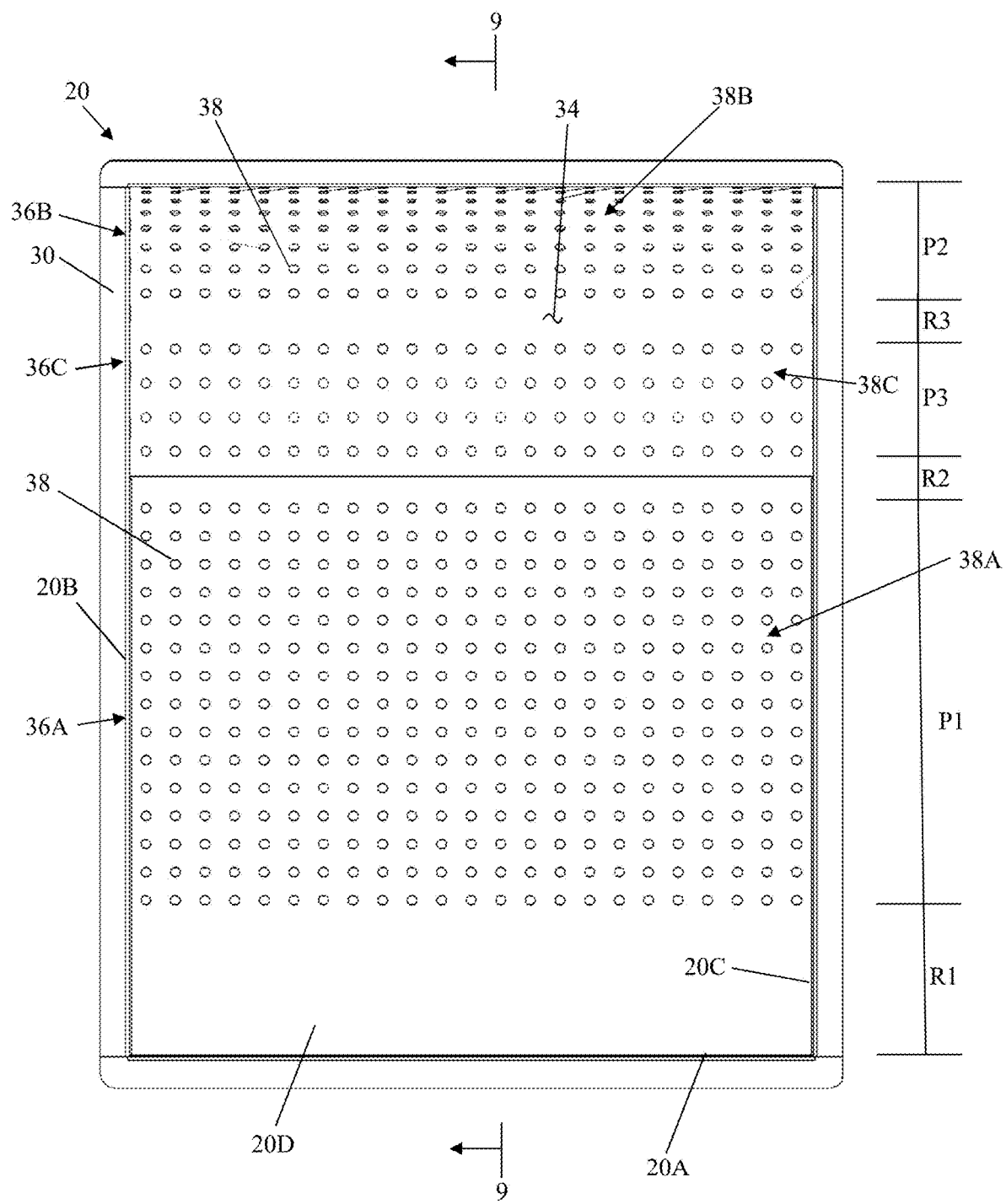
FIG. 8 is a top view of the heating tray.

As shown in FIGS. 6-8, in the illustrated embodiment, the food support 20 comprises a basket or tray (e.g., a heating basket or a heating tray). The food support 20 includes a front wall 20A, opposite first and second (e.g., left and right) side walls 20B and 20C and a bottom wall 20D. Other configurations are within the scope of the present disclosure. The food support 20 may be fabricated from suitable material (e.g., stainless steel) as a single part or from multiple parts secured together. The bottom wall 20D includes a front end (e.g., edge margin) connected to the front wall 20A, and first and second sides (e.g., edge margins) connected to the first and second side walls 20B, 20C, respectively. The food support 20 includes a flange or lip 30 extending around the periphery of the upper end of the food support. The lip 30 rests on a rim 32 of the food heating unit 14 (FIG. 1), with the rest of the food support extending through an opening in the rim. This allows the food support 20 to be removable from the rest of the food heating unit 14. Other arrangements may be used without departing from the scope of the present disclosure. For example, the food support 20 may not be removable or may be removable in other ways. Moreover, other components, as described herein, may be removable (e.g., removable or separable from other components). A rear end (e.g., rear edge margin) of the bottom wall 20D is connected to the lip 30. As explained in more detail below, the bottom wall 20D is configured to direct the gas rearward when the gas enters the gas supply plenum 22. The food support can have other configurations without departing from the scope of the present disclosure. For example, the food support may omit certain walls (e.g., opposite side walls 20B, 20C), without departing from the scope of the present disclosure.

The food support 20 defines a food compartment which bounds a food receiving space 34 sized and shaped for receiving the food. The food receiving space 34 is bounded by the front wall 20A, the first and second side walls 20B, 20C and the bottom wall 20D. The food receiving space 34 has an open top in open communication with a surrounding environment outside the oven 10. The open top allows an operator or food server to place or dump food, after the food has been cooked, into the food receiving space 34 and to reach into the food receiving space and retrieve or collect the food contained therein. In other embodiments, one or more walls of the food support and walls of other components of the oven may together define the walls forming the food compartment bounding the food receiving space.

Figure 2:
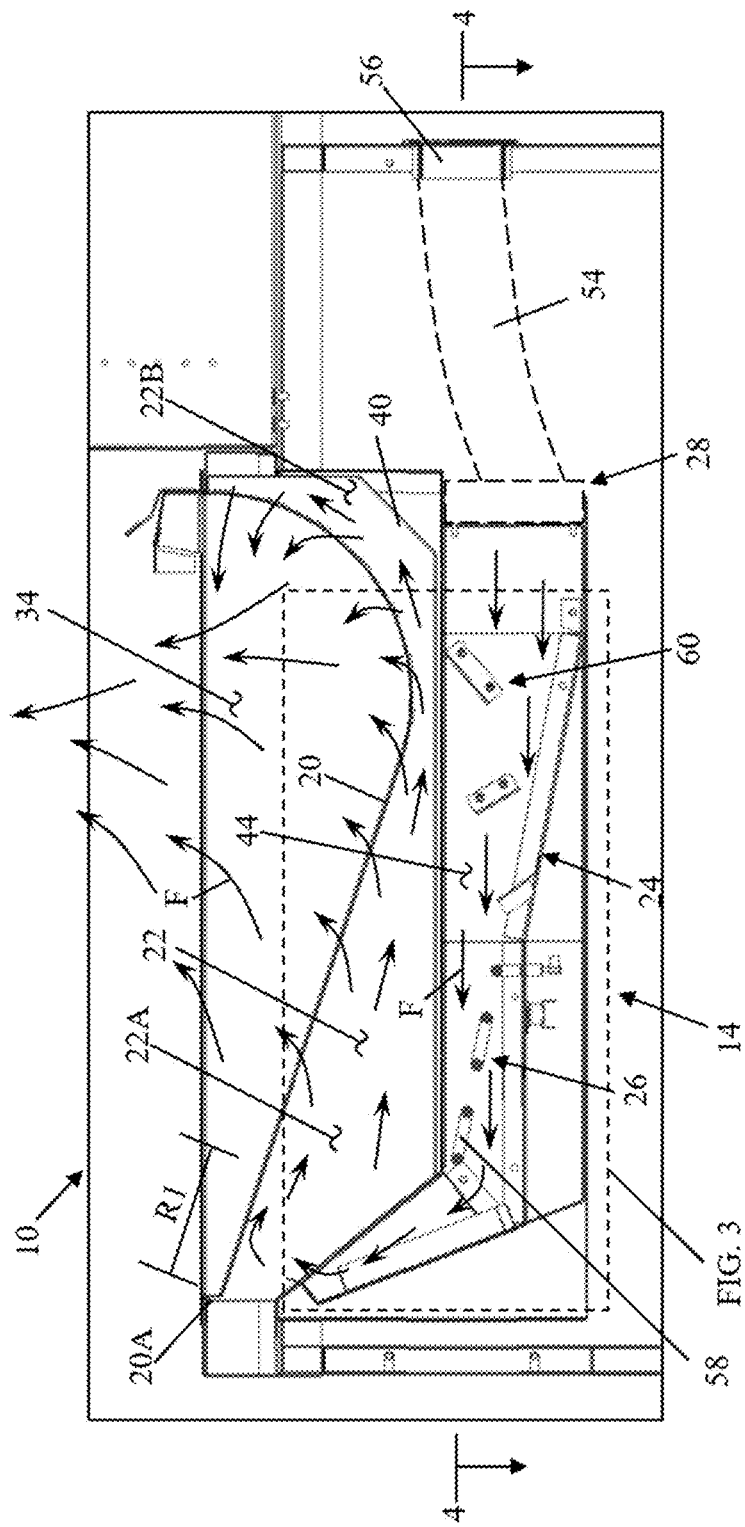
FIG. 2 is a fragmentary cross section of the oven taken through line 2-2 of FIG. 1.
Figure 9:
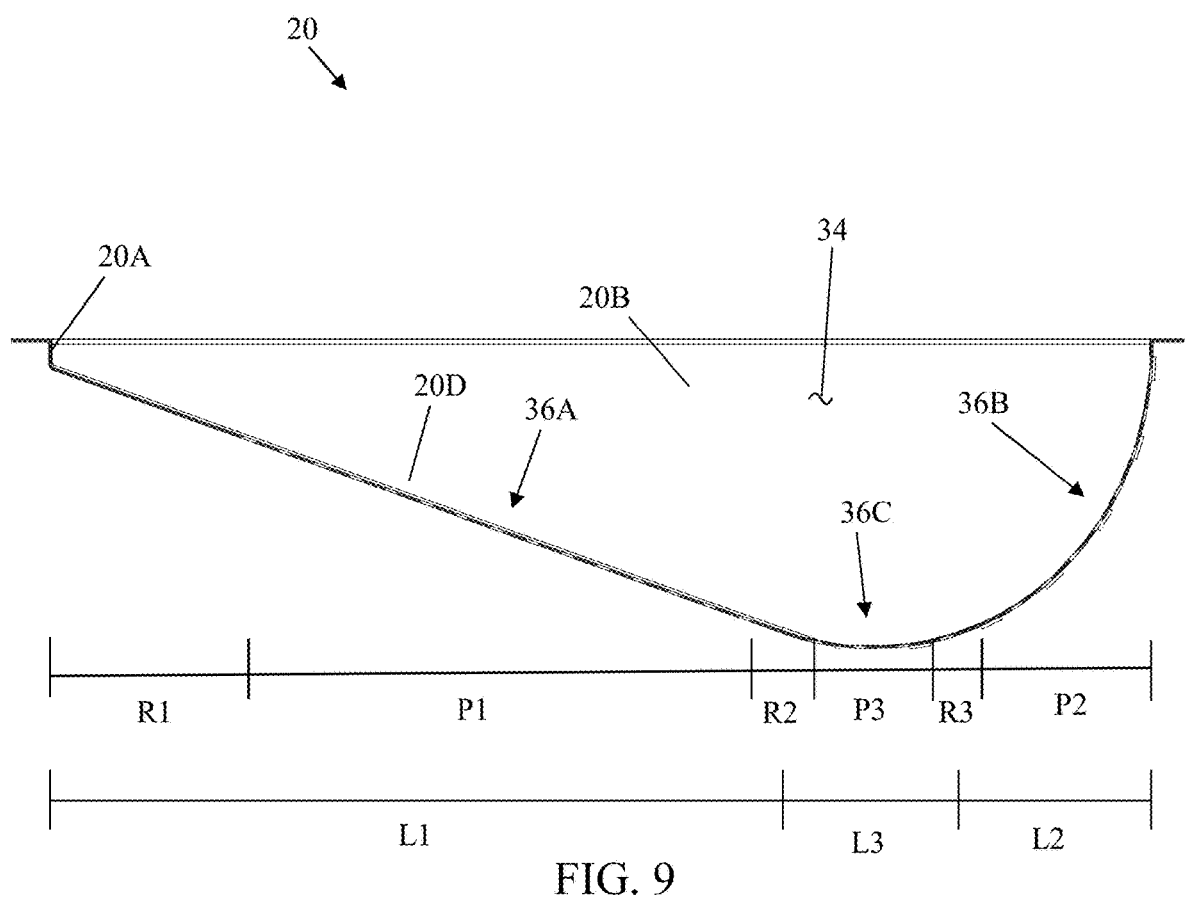
FIG. 9 is a section of the heating tray taken in a plane including line 9-9 of FIG. 8.

Referring to FIGS. 7 and 8, the bottom wall 20D bounds the lower or bottom end and the rear end of the food receiving space 34. Other configurations are within the scope of the present disclosure. The bottom wall 20D includes a bottom wall forward portion 36A, a bottom wall rearward portion 36B, and a bottom wall valley portion 36C therebetween. The bottom wall forward portion 36A extends rearward and downward to the bottom wall valley portion 36C, and the bottom wall rearward portion 36B extends rearward and upward from the bottom wall valley portion. In the illustrated embodiment, the bottom wall rearward portion 36B forms what may be considered to be a rear wall of the food support 20. The bottom wall forward portion 36A is substantially smooth and planar and slopes downward. The bottom wall valley portion 36C is substantially smooth, extends downward from the bottom wall forward portion 36A, defines a valley of the bottom wall, and curves upward to the bottom wall rearward portion 36B. The bottom wall rearward portion 36B is substantially smooth and curves upward from the bottom wall valley portion (e.g., a rear end or edge margin thereof). The bottom wall forward portion 36A extends downward and away (e.g., slopes downward) from the front wall 20A (e.g., a front edge margin of the forward portion) toward the bottom wall valley portion 36C. As shown in FIG. 9, the bottom wall forward portion 38A has a horizontal length L1, the bottom wall rearward portion 38B has a horizontal length L2 less than the length L1, and the bottom wall valley portion 38C has a horizontal length L3 greater than the length L2. The front wall 20A is generally planar and extends upward from the bottom wall forward portion 36A (FIG. 2). The first and second side walls 20B, 20C extend upward from the bottom wall 20D and extend between the front wall 20A and bottom wall rearward portion 36A to close the sides of the food support 20 (e.g., food receiving space 34). As explained in more detail below, the bottom wall 20D, specifically the bottom wall forward portion 36A, is configured to direct the gas rearward toward the rear end of the bottom wall when the gas enters the gas supply plenum 22.

The food support 20 includes a plurality of gas flow inlets 38 (e.g., openings or perforations) to permit the gas to flow into the food receiving space 34 and/or to permit particles (e.g., salt or crumbs) and oil to pass through the food support. In the illustrated embodiment, the bottom wall 20D includes the gas flow inlets 38, although other configurations or placements of the gas flow inlets are within the scope of the present disclosure. For example, the side walls 20B, 20C may include gas flow inlets 38. The gas flow inlets 38 have a generally circular shape. Other shapes and arrangements of gas flow inlets 38 may be used without departing from the scope of the present disclosure. The arrangement of gas flow inlets 38 in the bottom wall 20D promotes desired flow of heated gas across the food supported on the bottom wall, as will become apparent.

The bottom wall 20D has a first group of gas flow inlets 38A extending across a first perforated area P1, a second group of gas flow inlets 38B extending across a second perforated area P2, and third group of gas flow inlets 38C extending across a third perforated area P3. The gas flow inlets 38 of each group 38A-C are arranged in a generally uniform pattern. For example, in the illustrated embodiment, the gas flow inlets 38 of each group 38A-C are arranged in a grid configuration, as shown in FIG. 8. The groups of gas flow inlets 38A-C (and the perforated areas P1, P2, P3) are separated by regions R1, R2, R3 of the bottom wall 20D that are substantially free of gas flow openings, and desirably have no gas flow openings. As used herein, "substantially free of gas flow openings" means the cumulative gas flow opening area per surface area of the respective wall portion (total area of gas flow openings divided by area of wall portion) is less than about 5%. More desirably, at least the region R1 has a cumulative gas flow opening area per surface area of less than about 4%, more desirably less than about 3%, more desirably, less than about 2%. In the illustrated embodiment, the regions R1, R2, R3 of the bottom wall 20D break or disrupt the arrangement or pattern of each group of gas flow inlets 38A-C, to define a boundary or distinction between the generally uniform pattern of each group of gas flow inlets and between the respective perforated areas P1, P2, P3.

The bottom wall forward portion 36A includes the first group of gas flow inlets 38A of the plurality of gas flow inlets 38. The perforated area P1 having the first group of gas flow inlets 38A is forwardly and rearwardly bounded by the first and second regions R1, R2, respectively, that are free of gas flow inlets. The bottom wall forward portion 36A includes the first region R1, the perforated area P1, and half of the second region R2. As explained in more detail below, the first region R1 of the bottom wall forward portion 36A is configured to direct gas rearward when the gas enters the gas supply plenum 22. The first region R1 extends in a rearward direction from the front end of the bottom wall 20D.

The bottom wall rearward portion 36B includes the second perforated area P2 having the second group of gas flow inlets 38B of the plurality of gas flow inlets 38. The perforated area P2 having the second group of gas flow inlets 38B is forwardly bounded by the third region R3, respectively, of the bottom wall 20D. In the illustrated embodiment, the second perforated area P2 extends from the third region R3 to the rear edge margin of the bottom wall 20D (e.g., the second group 38B is rearwardly bounded by the rear edge margin). The bottom wall valley portion 36C includes the third perforated area P3 having the third group of gas flow inlets 38C, which is forwardly bounded by the second region R2 and rearwardly bounded by the third region R3. The bottom wall valley portion 36C includes half of the second region R2 and half of the third region R3. The rearward bottom wall portion 36B includes half of the third region R3. In the illustrated embodiment, the third perforated area P3 having the third group of gas flow inlets 38C extends from the second region R2 to the third region R3.

The combined flow area of the flow inlets 38A is greater than the combined flow area of the flow inlets 38B, which is greater than the combined flow area of the flow inlets 38C. In the illustrated embodiment, the size of the flow inlets is the same in the groups 38A, 38B, and 38C, but the flow inlets in the group 38C are spaced apart more than the flow inlets in the groups 38A and 38B. In other words, the percentage of cumulative gas flow area (total flow area divided by area of the respective perforated area P3) provided by the groups of openings 38C is less than the percentage flow area provided by the groups of openings 38A and 38B. For example, in one embodiment, the percentage of cumulative gas flow area per perforated area of the bottom wall forward portion 36A is about 9.5%, the percentage of the cumulative gas flow area per perforated area of the bottom wall rearward portion 36B is about 9.5%, and the percentage of the cumulative gas flow area per perforated area of the bottom wall valley portion 36C is about 9%. Other percentages are within the scope of the present disclosure. The area of each perforated area P1, P2, P3 is the area over which the inlets 38 are disposed. For example, the perforated area P1 of the bottom wall forward portion 36A is the area of the bottom wall forward portion minus the first region R1 and the forward half of the second region R2 (e.g., the width of the bottom wall 20D times the distance between the first and second regions R1, R2); the perforated area P3 of the bottom wall valley portion 36C is the area of the bottom wall valley portion minus the rear half of the second region R2 and forward half of the third region R3 (e.g., the width of the bottom wall times the distance between the second and third regions R2, R3); and the area of the perforated area P2 is the area of the bottom wall rearward portion 36B minus the rear half of the third region R3 (e.g., the width of the bottom wall times the distance between the third region R3 and the rear edge margin of the bottom wall). As explained in more detail below, the configuration of gas flow inlets 38 facilitates generally uniform distribution of gas over the food receiving space 34 when the gas flows through the gas flow inlets into the food receiving space. This configuration of gas flow inlets 38 also reduces or inhibits the flow of gas in a forward direction when the gas exits the food receiving space 34 through the open top.

It will be appreciated that the upper surface of the bottom wall 20D can be referred to as a food support surface, and the configuration of the bottom wall facilitates scooping of the food out of the food support 20. The food support surface is substantially smooth and continuous for facilitating removal of food from the food receiving space 34. The removal of food can be carried out with a scoop (or similar implement) and/or a food package (e.g., a carton) using a forward-to-rearward scooping motion to transfer food from the food support surface to the scoop and/or package. A user can slide a food scoop and/or carton rearward and downward along the forward bottom wall portion 36A, and optionally rearward along the valley portion 36C and along part of the rearward bottom wall portion 36B, to collect food in the scoop. The scoop may push the food upward along the rearward bottom wall portion 36B so that the food falls downward into the scoop. The gas flow inlets 38 in the food support permit salt and other food particles to pass through the food support surface and permit the gas to flow through the food support surface.

As shown in FIG. 6, the food holding unit 14 of the oven 10 includes a catch pan 40 configured for catching particles (e.g., salt and food particles) and oil or other liquids which may fall through the food support 20 for disposal. The catch pan 40 includes upstanding peripheral walls, including a front wall, rear wall, opposite side walls, and a non-perforated bottom wall. The front and rear walls include lower angled portions extending upward (and generally away from one another) from the front and rear ends of the bottom wall. The front wall of the catch pan 40 includes a gas supply plenum inlet 42 (e.g., opening) to permit gas to flow into the gas supply plenum 22. The catch pan 40 defines a cavity with an open top that receives the food support 20 when the food support is supported by the rim 32. The catch pan 40 may be removable, for emptying the contents of the catch pan. Other types of catch pans or other arrangements for collecting and removing the particles and/or oil may be used without departing from the scope of the present disclosure.

Figure 3:
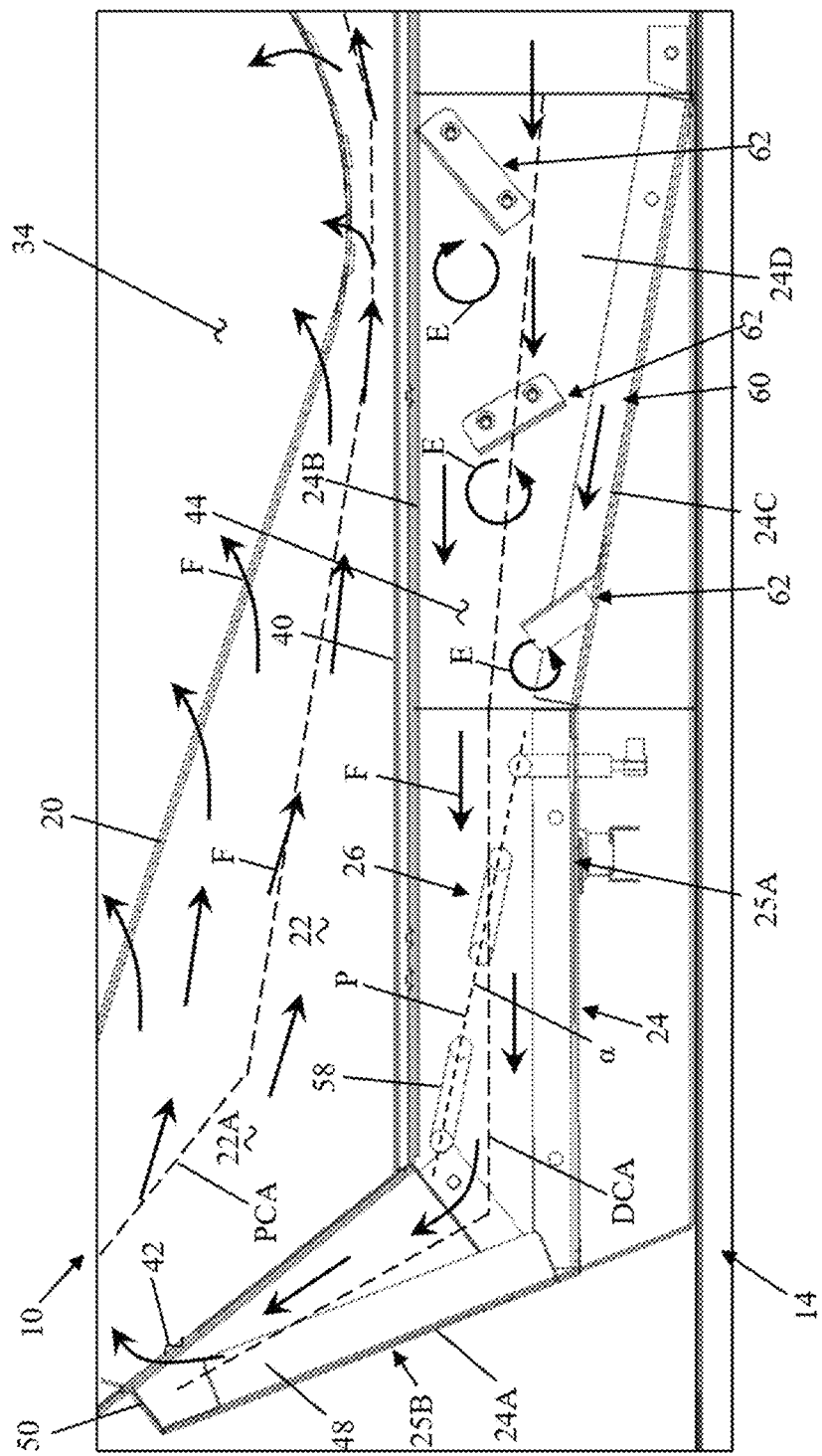
FIG. 3 is an enlarged, fragmentary view of a portion of the cross section of FIG. 2.
Figure 4:
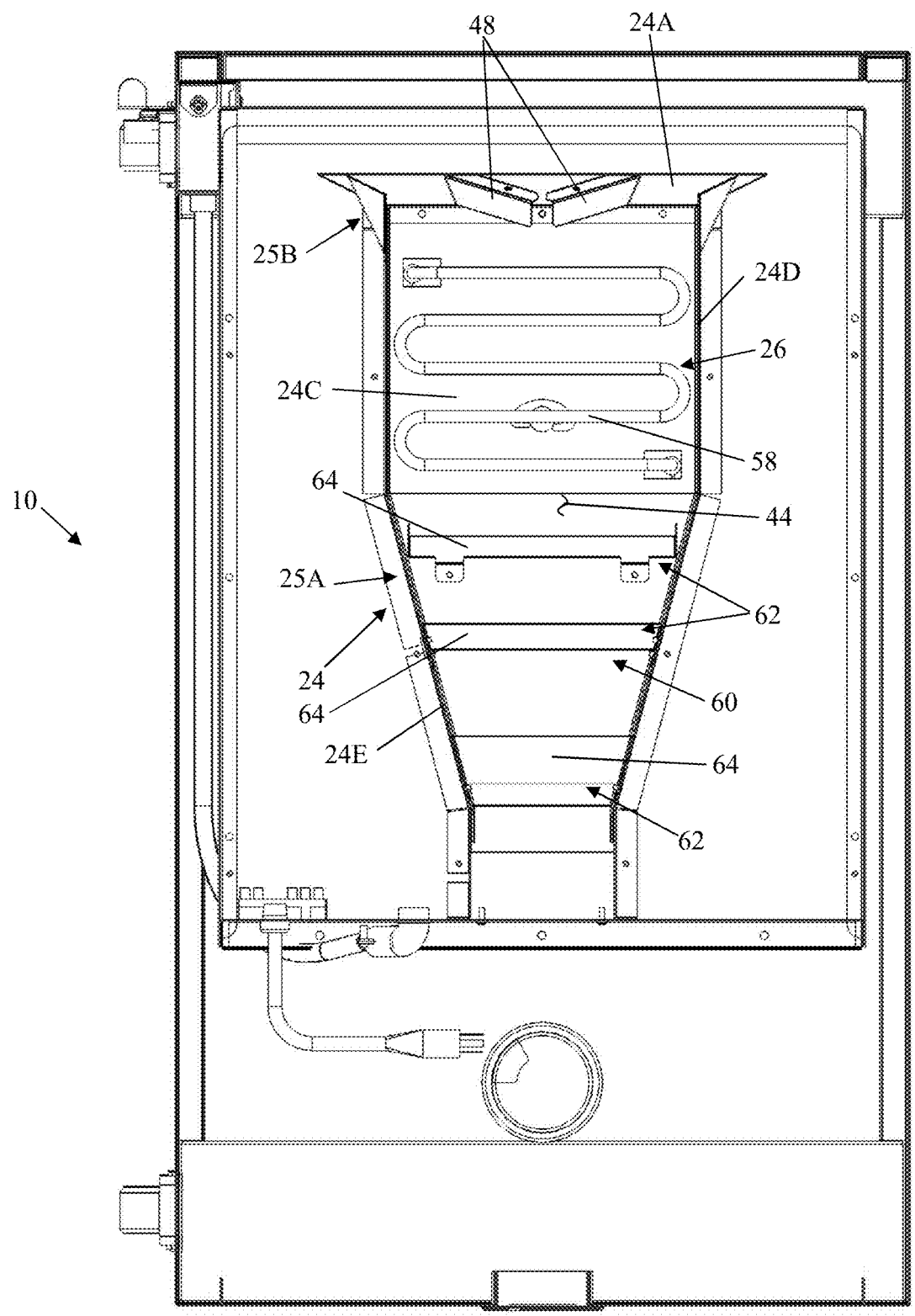
FIG. 4 is a cross section of the oven taken through line 4-4 of FIG. 2.
Figure 5:
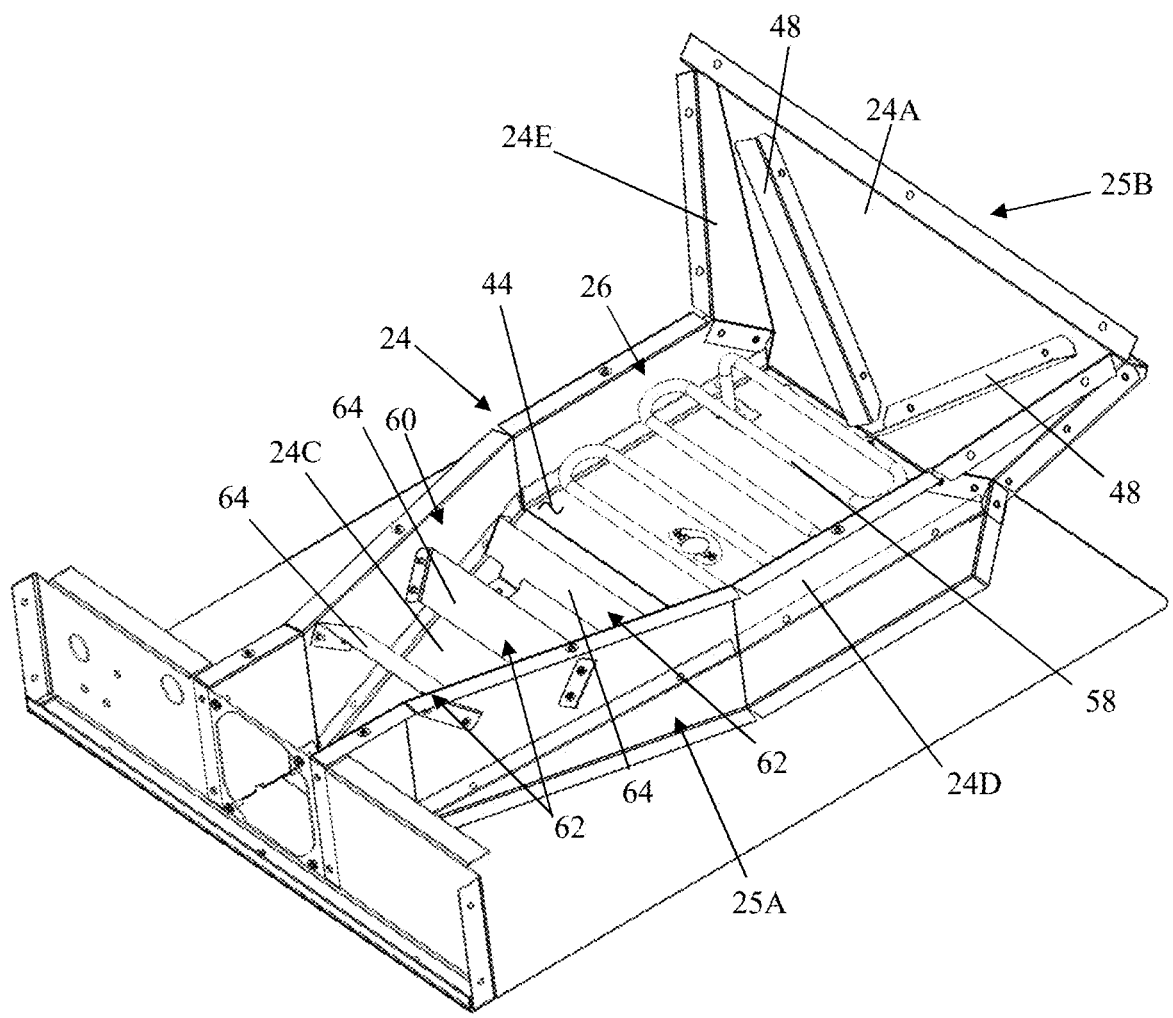
FIG. 5 is a perspective of a gas supply duct of the oven, with other portions of the oven hidden from view to show interior details.

Referring to FIGS. 2 and 3, the catch pan 40 and food support 20 together define the gas supply plenum 22. The gas supply plenum 22 is in open, fluid communication with (broadly, fluidly coupled to) the plurality of gas flow inlets 38. As explained in more detail below, gas flows into the gas supply plenum 22 through the gas supply plenum inlet 42 and out of the gas supply plenum through the plurality of gas flow inlets 38. The gas supply plenum 22 is disposed below the food receiving space 34. The gas supply plenum 22 is disposed below the bottom wall 20D. The gas supply plenum 22 has a generally uniform width. The gas supply plenum 22 has a plenum central axis PCA (axis generally extending along the length of the plenum equidistant from upper and lower walls and left and right walls bounding the plenum) and includes a plenum forward portion 22A and a plenum rearward portion 22B. The plenum forward portion 22A has a volume (e.g., a plenum forward portion volume) that is greater than a volume (e.g., a plenum rearward portion volume) of the plenum rearward portion 22B. The plenum forward portion 22A has a greater cross-sectional gas flow area (orthogonal to the plenum central axis PCA) than the plenum rearward portion 22B (and than the gas supply passageway 44 and outlet 42). In general, the cross-sectional flow area of the plenum forward portion 22A expands initially as it extends rearward but then reduces as it extends farther rearward. As explained in more detail below, this configuration of relative volumes and cross-sectional flow areas between the plenum forward and rearward portions 22A, 22B facilitates the general equalization of pressure over the gas supply plenum 22 to create a more uniform distribution of gas through the gas flow inlets 38 and promotes the flow of the gas in a rearward direction from the gas supply plenum inlet 42. The plenum forward portion 22A is upstream of the plenum rearward portion 22B such that the gas first flows into the plenum forward portion when the gas flows into the gas supply plenum 22. To reach the plenum rearward portion 22B, the gas must flow through the plenum forward portion 22A. The bottom wall forward portion 36A generally overlies the plenum forward portion 22A, the bottom wall valley portion 36C overlies the transition from the plenum forward portion to the plenum rearward portion, and the bottom wall rearward portion 36B generally overlies the plenum rearward portion 22B. Other configurations of the gas supply plenum 22 are within the scope of the present disclosure.

As mentioned above, the bottom wall 20D, specifically the bottom wall forward portion 36A, is configured to direct the gas rearward when the gas enters the gas supply plenum 22. The first region R1 of the bottom wall 20D (e.g., forward section of the bottom wall forward portion 36A), which is free of gas flow inlets 38, is proximate the gas supply plenum inlet 42. Specifically, the first region R1 of the bottom wall 20D generally overlies the gas supply plenum inlet 42. When the gas enters the gas supply plenum 22, any gas that contacts the first region R1 of the bottom wall 20D will be deflected by the region R1 to be directed in a general rearward direction through the gas supply plenum 22. In addition, because the bottom wall forward portion 36A is sloped downward, the first region R1 of the bottom wall 20D also generally directs the gas downwardly. In one embodiment, the horizontal length (extending forward/rearward) of the first region R1 of the bottom wall 20D is more than about 5% of the horizontal length (e.g., L1+L2+L3) of the bottom wall, or more than about 10% of the horizontal length of the bottom wall, or more than about 20% of the horizontal length of the bottom wall, or more than about 30% of the horizontal length of the bottom wall, or more than about 40% of the horizontal length of the bottom wall. For example, in one embodiment, the horizontal length of the first region R1 may be about 6.75 inches and the horizontal length of the bottom wall 20D may be about 22 inches, such that the horizontal length of the first region is about 31% of the horizontal length of the bottom wall. In another embodiment, the horizontal length of the first region R1 may be about 3.75 inches and the horizontal length of the bottom wall 20D may be about 22 inches, such that the horizontal length of the first region is about 17% of the horizontal length of the bottom wall. Other percentages are within the scope of the present disclosure. The horizontal length of the bottom wall 20D is the straight line distance between the front edge margin of the bottom wall and the rear edge margin of the bottom (L1 plus L3, plus L2), as shown in FIG. 9. The horizontal length of the region R1 can also be expressed as a percentage of the horizontal distance between the front edge margin 20A and the bottom of the valley defined by the bottom wall valley portion 36C, such as more than about 5%, more than about 10%, more than about 15%, more than about 20%, more than about 25%, more than about 30%, or more than about 35%. Because the first region R1 is free of gas flow inlets 38, the bottom wall 20D does not permit gas to flow into the food receiving space 34 adjacent the front end of the food holding unit 14, thereby reducing the amount of gas able to come into contact with the operator or sever.

Referring to FIGS. 2-5, the gas supply duct 24 carries or directs the gas to the gas supply plenum 22. The gas supply duct 24 has or defines a gas supply passageway 44 that is fluidly coupled to the gas supply plenum (via the gas supply plenum inlet 42). Thus, the gas supply passageway 44 is fluidly coupled to the gas supply inlets 38 via the gas supply plenum 22. The gas supply duct 24 includes a front wall 24A, an upper wall 24B, a lower wall 24C and opposite first and second side walls 24D and 24E, respectively. The gas supply passageway 44 is bounded by the front wall 24A, the upper wall 24B, the lower wall 24C and the opposite first and second side walls 24D, 24E.

The gas supply duct 24 includes a first gas supply duct section 25A and a second gas supply duct section 25B downstream from the first gas supply duct section. In the illustrated embodiment, the first and second gas supply duct sections 25A, 25B are disposed below the gas supply plenum 22, and the second gas supply duct section 25B generally extends toward the gas supply plenum 22 (specifically, the gas supply plenum inlet 42). The gas supply duct 24 has a generally L-shape, with the second gas supply duct section 25B extending in a generally upward direction from the end of the generally horizontal first gas supply duct section 25A. The first and second gas supply duct sections 25A, 25B each define a portion of the gas supply passageway 44.

The gas supply duct 24 (e.g., the gas supply passageway 44) has a width extending between the first and second side walls 24D, 24E, a height extending between the upper and lower walls 24B, 24C (or between the front and upper walls 24A, 24B within the second gas supply duct section 25B), and a length extending between an end of the second gas supply duct section 25B (which is adjacent the gas supply plenum inlet 42) and an end of the first gas supply duct section 25A (which is adjacent the blower 28). The gas supply passageway 44 has a central axis DCA extending along the length of the gas supply passageway. The gas supply passageway 44 has a cross-sectional gas flow area (e.g., height×width) transverse to the central axis DCA. Desirably, the cross-sectional area of the gas supply passageway 44 is substantially uniform over the length of the gas supply passageway. As used herein, the term substantially uniform means the cross-sectional area of the gas supply passageway 44 varies (e.g., increases or decreases) by less than about 20% over the length of the gas supply passageway (e.g., the cross-sectional area at one location within the gas supply passageway is within 20% of the cross-sectional area at any other location within the gas supply passageway), or more desirably less than about 10% over the length of the gas supply passageway. In one embodiment, the cross-sectional area of the gas supply passageway 44 may be constant over the length of the gas supply passageway. If the cross-sectional area of the gas supply passageway 44 varies over the length of the gas supply passageway, desirably the cross-sectional area increases along the length, as the gas supply passageway extends downstream. By maintaining a substantially uniform cross-sectional area of the gas supply passageway 44, the back pressure on the blower 28 is minimized.

In the illustrated embodiment, the gas supply duct 24 tapers as the gas supply duct extends downstream. The gas supply duct 24 becomes wider and shorter as the gas supply duct extends toward the gas supply plenum inlet 42. Desirably, the width of the gas supply passageway 44 is about the same as the width of the gas supply plenum 22. This provides a more uniform flow over the entire width of the gas supply plenum 22 when the gas flows through the gas supply plenum inlet 42 and into the gas supply plenum. The width of the gas supply passageway 44 (e.g., gas supply duct 24) increases as the gas supply passageway extends downstream, and a height of the gas supply passageway decreases as the gas supply passageway extends downstream. The generally simultaneous increase of the width and decrease of the height maintains the substantially uniform cross-sectional area of the gas supply passageway 44, as described above. The gas supply duct 24 (e.g., gas supply passageway 44) may gradually taper over its entire length, or portions of the gas supply duct may taper over sections of the length of the gas supply duct (with other sections having a generally constant cross-sectional area). For example, in the illustrated embodiment, the second gas supply duct section 25B tapers in height and width along generally its entire length, and the first gas supply duct section 25A includes a non-tapered (e.g., constant height and width) portion downstream of a tapered portion. Any one of the front wall 24A, the upper wall 24B, the lower wall 24C and/or the opposite first and second side walls 24D, 24E of the gas supply duct 24 may be tapered. The central axis DCA of the gas supply passageway 44 extends through the duct sections 25A, 25B following a path centrally down the passageway (spaced equally from the upper and lower duct walls and from the left and right duct walls at any given point along the length of the duct). First and second baffles 48 are mounted on the front wall 24A and extend into gas supply passageway 44 in the duct section 25B. The first and second baffles 48 facilitate the even distribution of the gas flow over the entire width of the gas supply passageway 44. In the illustrated embodiment, the baffles 48 are arranged in a generally V-shape. Other configurations of the gas supply duct 24 are within the scope of the present disclosure.

As mentioned above, the bottom wall 20D is configured to direct the gas rearward. The gas supply duct 24 may also be configured to direct the gas rearward, toward the rear end of the food support 20 (e.g., rear end of the bottom wall 20D) or rear end of the gas supply plenum 22, when the gas enters the gas supply plenum. Broadly, at least one of the bottom wall 20D or gas supply duct 24 is configured to direct the gas in a generally rearward direction into and through the gas supply plenum 22. By directing the gas in a rearward direction in the gas supply plenum 22, the gas is generally inhibited from flowing out of the food receiving space 34 in a forward direction and hitting the operator or server. By generally directing the gas rearward in the gas supply plenum 22, via the gas supply duct 24 and/or bottom wall 20D, the gas generally does not flow out of the food receiving space 34 in a forward direction, thereby preventing the hot gas from contacting and causing discomfort to the server. In the illustrated embodiment, the front wall 24A of the gas supply duct 24 includes a flange or lip 50 (e.g., baffle) that generally directs the gas in a rearward direction, through the gas supply plenum inlet 42 and the gas supply plenum 22. The flange 50 (FIG. 3) extends in a generally rearward direction toward the gas supply plenum inlet 42. The flange 50 may extend through the gas supply plenum inlet 42 into the gas supply plenum 22.

In the illustrated embodiment, the upper wall 24B of the gas supply duct 24 is part of a catch pan receptacle 46 (FIG. 6). The catch pan receptacle 46 includes upstanding peripheral walls, including a front wall, rear wall, opposite side walls, and a bottom wall. The front and bottom walls of the catch pan receptacle together define the upper wall 24B of the gas supply duct 24. In the illustrated embodiment, the front wall of the catch pan receptacle 46 defines an outlet 42 (e.g., opening) of the gas supply duct 24. The catch pan receptacle 46 is sized and shaped to receive the catch pan 40. The catch pan receptacle 46 defines a cavity with an open top that receives the catch pan 40. The catch pan receptacle 46 corresponds to the size and shape of the catch pan 40 (e.g., at least a lower portion thereof) to receive the catch pan and hold the catch pan in place. As mentioned above, the catch pan 40 may be removable, such as removable from the catch pan receptacle 46. Other arrangements of the catch pan receptacle 46 are within the scope of the present disclosure.

In the illustrated embodiment, the gas supply duct 24 is generally disposed within a supply duct receptacle 52 (FIG. 6). The supply duct receptacle 52 includes upstanding peripheral walls, including a front wall, rear wall, opposite side walls, and a bottom wall. In the illustrated embodiment, a portion of the bottom wall of the supply duct receptacle 52 is a part of (e.g., defines) a portion of the lower wall 24C of the gas supply duct 24. In the illustrated embodiment, the rear wall of the supply duct receptacle 52 defines a supply duct inlet and is mounted to the blower 28. The supply duct receptacle 52 is sized and shaped to receive the gas supply duct 24. The supply duct receptacle 52 defines a cavity with an open top that receives the gas supply duct 24. Other arrangements of the supply duct receptacle 52 are within the scope of the present disclosure.

Referring to FIG. 2, the blower of the food holding unit 14 is schematically indicated at reference numeral 28. The blower 28 blows gas through the food holding unit 14. Specifically, the blower 28 blows gas through the gas supply passageway 44, the gas supply plenum 22, and the gas flow inlets 38 and into the food receiving space 34. The gas leaves the food receiving space 34 through the open top. The blower 28 includes a fan (e.g., including a plurality of blades) (not shown) operatively connected to a prime mover (not shown) (collectively, a blower), such as an electric motor, to drive rotation of the fan blade and move or blow the gas through the food holding unit 14. The prime mover may be variable speed or single speed. In the illustrated embodiment, the blower is an axial blower (e.g., including a fan and a centrally mounted blower motor), although other types of blowers, such as tangential blowers, are within the scope of the present disclosure. In addition, the blower 28 may comprise more than one blower. The blower 28 is mounted on the supply duct receptacle 52 and generally defines the upstream end of the gas supply duct 24. A gas intake duct, schematically indicated at reference numeral 54 (FIG. 2), extends from the blower 28 to a gas intake 56 of the oven 10. The blower 28 draws gas from the surrounding environment outside the oven 10 through the gas intake 56 and gas intake duct 54 and pushes the gas into the gas supply duct 24. The blower 28 may be selectively turned on and off using switches (not shown) on the oven 10.

Referring to FIGS. 2-5, the heater 26 of the oven 10 is configured to heat the gas. The heater 26 heats the gas as the gas is blown by the blower 28 as the gas flows towards the food receiving space 34. The heater 26 includes at least one heating element 58 (broadly, at least one heater) to heat the gas. The at least one heating element 58 is disposed in the gas supply passageway 44 and heats the gas as it flows through the gas supply passageway. The heating element 58 may be an electric heating element with open coil heating segments capable of delivering substantial heat quickly to the gas passing by the heating element. Other types of heating elements, including finned heating elements, may be used without departing from the scope of the present disclosure. In the illustrated embodiment, the heater 26 includes one heating element 58, although the heater could include additional heating elements without departing from the scope of the present disclosure. The heater 26 may be selectively turned on and off using switches (not shown) on the oven 10, which can be separate from or integrated with the switch used to operate the blower.

In the illustrated embodiment, the heating element 58 extends along (e.g., defines) a heating element plane P (FIG. 3). In the illustrated embodiment, the heating element 58 extends in a serpentine shape along the heating element plane P. The heating element 58 includes generally straight heating element segments extending widthwise of the passageway 44 connected by turns between respective straight segments. The arrangement is such that the heating element segments extending widthwise with respect to the gas supply passageway 44 are spaced different distances from the central axis (e.g., above, below) of the gas supply passageway at different locations along the length of the gas supply passageway. The heating element plane P extends at a non-parallel skew angle α relative to the central axis DCA of the duct passageway 44. Accordingly, the heating element plane P extends at a non-orthogonal angle relative to the general direction of flow of the gas F through the gas supply passageway 44. In one embodiment, the angle α of the heating element plane P relative to the central axis DCA is in the inclusive range of about 5 degrees to about 60 degrees, or more desirably in the inclusive range of about 5 degrees to about 45 degrees, or more desirably in the inclusive range of about 10 degrees to about 30 degrees, or more desirably in the inclusive range of about 15 degrees to about 20 degrees. The angle of the heating element plane P allows more of the gas to come into contact with the segments of the heating element 58 and enables at least some of the gas to come into contact with the heating element 58 more than once. If the heating element plane P was parallel to the direction of flow F, some of the gas may miss the heating element (e.g., flow above or below the heating element). Similarly, if the heating element plane P was orthogonal to the direction of flow F, the gas would only come into contact with the heating element once. Accordingly, the heating element 58 of the present disclosure is more efficient at heating the passing gas.

Referring to FIGS. 2-5, the oven 10 may include a heat shield 60. The heat shield 60 is disposed in the gas supply passageway 44, upstream of the heater 26 (e.g., at least one heating element 58) and downstream of the blower 28. The heat shield 60 protects the blower 28, specifically the blower motor, from the heat (e.g., radiative heat) generated by the heating element 58 of the heater 26. Specifically, the heat shield 60 is configured to inhibit a direct line of sight between the at least one heating element 58 (e.g., generally any portion thereof) and the blower 28. By blocking a direct line of sight between the heating element 58 and the blower 28, radiative heat from the heating element 58 is generally inhibited from reaching the blower. Without the heat shield 60, the radiative heat from the heater 26 may overheat and damage the blower 28. For example, the radiative heat may melt or burn the insulation in the electric motor (e.g., prime mover) of the blower 28.

The heat shield 60 includes a plurality of baffles 62. In the illustrated embodiment, the heat shield 60 includes three baffles 62 although more or fewer baffles are within the scope of the present disclosure. The baffles 62 extend through the gas supply passageway 44 in a direction generally parallel to the width of the gas supply duct 24 and orthogonal to central axis DCA and the direction of flow F. The baffles 62 are mounted on the gas supply duct 24 (e.g., the side walls 24D, 24E and/or bottom wall 24C). As shown in FIGS. 2 and 3, the baffles 62 are arranged to prevent a direct line of sight between the heating element 58 and the blower 28. The baffles 62 are arranged to at least partially overlap one another to prevent line of sight from the heating element 58 to the blower 28 between the baffles. Desirably, an imaginary plane (not shown), which generally represents a line of sight, that extends through the gas supply passageway 44 from any portion of the at least one heating element 58 to any portion of the blower 28 intersects at least one baffle 62 of the heat shield 60 such that radiant heating of the blower by the heater is prevented. Each baffle 62 includes a generally planar wall 64 (broadly, body) extending through the gas supply passageway 44. The wall 64 of each baffle 62 is disposed (e.g., extends) at a non-orthogonal angle relative to the central axis DCA. The trailing or downstream edge of each baffle 62 generally creates an eddy E in the flow of the gas (FIG. 3). As a result, the flow of the gas through the gas supply passageway 44 becomes generally turbulent. The turbulent flow of gas results in greater heating efficiency and a more uniform gas temperature because the gas is continuously stirring and mixing as it moves past the heating element 58. Other configurations of the baffles 62 are within the scope of the present disclosure.

Referring to FIG. 2, as is now apparent, the blower 28 draws gas from the outside environment and delivers it to the food receiving space 34 through the gas flow inlets 38. The blower 28 draws the gas through the gas intake duct 54 and blows it through the gas supply duct 24, through the outlet 42, and into the gas supply plenum 22. The substantially uniform cross-sectional gas flow area of the gas flow passageway 44 opens to a larger cross-sectional gas flow area in the gas supply plenum forward portion 22A. The heater 26 heats the gas to be delivered to the food receiving space 34. The heated gas heats the food held on the food support surface of the food support 20. The flow of heated gas across the food and around the food helps to hold the heat in the food, thereby extending the holding time for the food. Gas is exhausted from the food receiving space 34 generally upward through the open top of the food support 20. The gas is generally inhibited from flowing in a forward direction out of the food support 20, thereby preventing the operator or server from experiencing discomfort due to the heated gas.

Referring again to FIGS. 2 and 3, the food support 20 is configured for providing a desired heated gas flow over and/or through the food held in the food receiving space 34. More specifically, the bottom wall 20D of the food support 20, the gas supply plenum 22, and the gas flow inlets 38 are arranged to cause the heated gas to flow in a generally rearward direction over and/or through substantially all of the food held in the food receiving space 34 before being exhausted into the surrounding environment. As mentioned above, the gas supply duct 24 and/or the bottom wall 22 direct the gas in a rearward direction when the gas enters the gas supply plenum 22 (specifically, the plenum forward portion 22A). In particular, the flange 50 of the front wall 22A of the gas supply duct 24 and the first region R1 of the bottom wall 22D generally direct the gas in a rearward direction through the plenum forward portion 22A and into the plenum rearward portion 22B. The large volume of the plenum forward portion 22A (relative to the volume of the gas flow passageway 44) encourages the gas to flow into the gas supply plenum 22, thereby reducing back pressure on the blower 28. The volume of the plenum forward portion 22A increases and then reduces as the plenum forward portion extends in a rearward direction toward the plenum rearward portion 22B. As the gas moves through the gas supply plenum 22, some of the gas moves through the gas flow inlets 38 into the food receiving space 34 from the plenum forward portion 22A and some of the gas moves into the plenum rearward portion 22B. As a result of some of the gas moving into the food receiving space 34, the pressure of the gas remaining in the plenum and moving rearward drops. However, the smaller volume of the plenum rearward portion 22B compensates for some of this lost pressure, resulting in a generally uniform flow of gas through the gas flow inlets 38 in fluid communication with both the plenum forward and rearward portions 22A, 22B. In addition, the smaller volume of the plenum rearward portion 22B may generate a small amount of back pressure in the gas supply plenum 22, thereby encouraging the gas to flow through the gas flow inlets 38 in communication with the plenum forward portion 22A, resulting in more air flowing in a rearward direction in the food receiving space 34. The placement of the gas flow inlets 38 encourages the gas to flow in a more uniform manner into the food receiving space.

Overall, the arrangement of the bottom wall 20D of the food support 20, the gas supply plenum 22, and the gas flow inlets 38 causes the heated gas to flow in a generally rearward direction toward the rear end of the food receiving space 34 before being exhausted through the open top. A majority of the gas enters the food receiving space 34 from the gas flow inlets 38 in the first group 38A and travels in a generally rearward direction. Gas also enters the food receiving space 34 from the gas flow inlets 38 in the second and third groups 38C, 38B traveling in a generally upward direction and in a generally forward direction, respectively. The mixing of these streams (e.g., rearward, upward and forward streams) of gas results in the gas being exhausted in a generally upward direction, as shown in FIG. 2, through the open top of the food support 20. Thus, a substantial portion of the heated gas does not come into contact with the operator or server standing in front of the oven 10. As the gas moves through the food receiving space 34, the heated gas flows over and/or through substantially all of the food in the receiving space, heating the food. Desirably, the gas from the inlets 38 in the bottom wall forward portion 36A and bottom wall rearward portion 36B flows over the food to envelop the food in warm air, and the gas from the inlets 38 in the bottom wall valley portion 36C flows into the food (e.g., into a pile of fries settled in the valley portion). It will be appreciated that if gas flow inlets 38 were only provided in the bottom wall forward portion 36A, not enough heated gas would reach the food held toward the rear end of the food support 20 to keep that food warm.

In operation, cooked food from a cooking device, such as a fryer, is placed on the food support 20 in the food receiving space 34. For example, sweet potato fries or onion rings may be positioned in the food receiving space 34. The food is heated in the food receiving space 34 under desired gas flow and temperature conditions by the delivery of heated gas to the food receiving space. Gas exits the food receiving space, traveling generally upwards, through the open top in the food support 20. Desirably, food particles and oil fall to the catch pan 40, for collection and removal. When it is desired to serve food from the food receiving space 34, the food is removed from the food receiving space using a scooping motion.

The example gas flow for the oven 10 illustrated in FIGS. 2 and 3 is shown by example without limitation. Other constructions and other gas flows in the oven 10 (e.g., gas flows in the food support 20) may be used without departing from the scope of the present disclosure. In the example shown, gas in the surrounding environment is drawn into the oven 10, through the gas intake 56 and into the gas intake duct 54 by the blower 28. The blower 28 then blows the gas F into gas supply passageway 44 of the gas supply duct 24. The gas F flows in a generally forward direction through the first gas supply duct section 25A, generally under the food receiving space 34 (e.g., food support 20). As the gas F moves through the first gas supply duct section 25A, the gas flows past the heat shield 62, which imparts a generally turbulent flow to the gas, and the heater 26, which heats the gas. After, the gas F enters the second gas supply duct section 25B. The gas F flows in a generally upward direction through the second gas supply duct section 25B toward the gas supply plenum inlet 42. The gas F exits the gas supply duct outlet 42 into the forward portion 22A of the gas supply plenum 22 having the greater cross-sectional gas flow area than the gas supply duct and the outlet 42. The gas F flows in a generally rearward direction through the gas supply plenum 22. The gas F flows through the plenum forward portion 22A and the plenum rearward portion 22B and into the food receiving space via the gas flow inlets 38. The gas F flows within the food receiving space 34, as described above, before flowing in a generally upward direction out of the oven 10 and into the surrounding environment.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An oven for heating food, the oven comprising:
  a food heating compartment bounding a food holding space sized and shaped to receive the food to be heated, the food heating compartment having opposite first and second side walls and a bottom wall having a bottom wall forward portion and a bottom wall rearward portion, the food holding space having an open top in open communication with a surrounding environment outside the oven, the bottom wall having a plurality of gas flow inlets and defining a food support surface for supporting food in the food holding space, the bottom wall including a bottom wall valley portion defining a valley in the bottom wall, the bottom wall forward portion sloping downward and rearward to the bottom wall valley portion, the bottom wall rearward portion extending upward from the bottom wall valley portion, the bottom wall forward portion having a greater horizontal length than the bottom wall rearward portion, the bottom wall forward portion including a first perforated area including a first group of the gas flow inlets, the bottom wall rearward portion including a second perforated area including a second group of the gas flow inlets, and the bottom wall valley portion including a third perforated area including a third group of the gas flow inlets, the first group of gas flow inlets providing the first perforated area with a first percentage of cumulative gas flow area per area of the first perforated area, the second group of gas flow inlets providing the second perforated area with a second percentage of cumulative gas flow area per area of the second perforated area, and the third group of gas flow inlets providing the third perforated area with a third percentage of cumulative gas flow area per area of the third perforated area, the third percentage being less than the first percentage;
  a gas supply plenum disposed below the food holding space and in fluid communication with the food holding space via the plurality of gas flow inlets, the gas supply plenum including a gas supply plenum forward portion below the bottom wall forward portion and including a gas supply plenum rearward portion below the bottom wall rearward portion;
  a gas supply duct defining a gas supply passageway disposed below the gas supply plenum, the gas supply passageway fluidly coupled to and upstream from the gas supply plenum;
  a heater configured to heat the gas; and
  a blower configured to blow the gas through the gas supply passageway into the gas supply plenum and through the plurality of gas flow inlets into the food holding space.

2. The oven of claim 1, wherein the third percentage is less than the second percentage.

3. The oven of claim 1, wherein the food support surface bounds a bottom of the food holding space, wherein the bottom wall forward portion and the bottom wall rearward portion each form a portion of the food support surface, and wherein the gas supply plenum forward portion is below the food support surface and the gas supply plenum rearward portion is below the food support surface.

4. The oven of claim 1, wherein the first and second side walls and the bottom wall bound the food holding space, and the bottom wall bounds the gas supply plenum.

5. The oven of claim 1, wherein the gas supply plenum forward portion is below the food holding space and the gas supply plenum rearward portion is below the food holding space.

6. The oven of claim 1, wherein the heater is in the gas supply duct and is arranged to heat the gas as the gas flows along the gas supply passageway.

7. The oven of claim 1, further comprising a gas intake spaced apart from the food holding space, the blower and the gas intake arranged relative to one another such that the blower draws the gas from an exterior environment surrounding the oven through the gas intake.

8. The oven of claim 1, wherein
the plurality of gas flow inlets are arranged to permit gas to flow upward into the food holding space from the gas supply plenum.

9. The oven of claim 1, wherein the gas supply duct is configured to deliver gas to the gas supply plenum forward portion.

10. The oven of claim 9, wherein at least one of the gas supply duct or the bottom wall is configured to direct the gas rearward toward the bottom wall rearward portion when the gas enters the gas supply plenum.

11. The oven of claim 10, wherein the bottom wall forward portion comprises a region substantially free of openings through which gas can pass from the gas supply plenum into the food holding space, said region overlying an outlet of the gas supply duct to deflect flow of gas in the gas supply plenum downward and rearward.

12. The oven of claim 1, wherein the gas supply duct includes a gas supply duct rearward section disposed below the gas supply plenum rearward portion and a gas supply duct forward section downstream of the gas supply duct rearward section.

13. The oven of claim 12, wherein gas flows in a generally forward direction through the gas supply duct rearward section and under the food holding space, in a generally upward direction through the gas supply duct forward section and in a generally rearward direction through the gas supply plenum.

14. The oven of claim 13, wherein the bottom wall further includes a bottom wall valley portion defining a valley in the bottom wall, the bottom wall forward portion sloping downward and rearward to the bottom wall valley portion, the bottom wall rearward portion extending upward from the bottom wall valley portion, the bottom wall forward portion having a greater horizontal length than the bottom wall rearward portion.

15. The oven of claim 1, wherein the gas supply passageway has a substantially uniform cross-sectional gas flow area along a length of the gas supply passageway.

16. The oven of claim 15, wherein the gas supply duct tapers as the gas supply duct extends downstream such that a width of the gas supply passageway increases as the gas supply passageway extends downstream and a height of the gas supply passageway decreases as the gas supply passageway extends downstream.

17. An oven for heating food, the oven comprising:
a food heating compartment bounding a food holding space sized and shaped for receiving the food to be heated, the food heating compartment having opposite first and second side walls and a bottom wall having a bottom wall forward portion and a bottom wall rearward portion, the food holding space having an open top in open communication with a surrounding environment outside the oven, the bottom wall having a plurality of gas flow inlets and defining a food support surface for supporting food in the food holding space, the bottom wall including a bottom wall valley portion defining a valley in the bottom wall, the bottom wall forward portion sloping downward and rearward to the bottom wall valley portion, the bottom wall rearward portion extending upward from the bottom wall valley portion, the bottom wall forward portion having a greater horizontal length than the bottom wall rearward portion, the bottom wall forward portion including a first perforated area including a first group of the gas flow inlets, the bottom wall rearward portion including a second perforated area including a second group of the gas flow inlets, and the bottom wall valley portion including a third perforated area including a third group of the gas flow inlets, the first group of gas flow inlets proving the first perforated area with a first percentage of cumulative gas flow area per area of the first perforated area, the second group of gas flow inlets providing the second perforated area with a second percentage of cumulative gas flow area per area of the second perforated area, and the third group of gas flow inlets providing the third perforated area with a third percentage of cumulative gas flow area per area of the third perforated area, the third percentage being less than the first percentage;
a gas supply plenum disposed below the food holding space and in fluid communication with the food holding space via the plurality of gas flow inlets, the gas supply plenum having a gas supply plenum forward portion below the bottom wall forward portion and having a gas supply plenum rearward portion below the bottom wall rearward portion, the gas supply plenum rearward portion being downstream from the gas supply plenum forward portion;
a gas supply duct defining a gas supply passageway, the gas supply duct having an outlet out of which gas flows from the gas supply passageway into the gas supply plenum forward portion;
a heater configured to heat the gas;
a blower configured to blow the gas through the gas supply passageway into the gas supply plenum forward portion, from the gas supply plenum forward portion into the gas supply plenum rearward portion, and from the gas supply plenum through the plurality of gas flow inlets into the food holding space.

18. The oven of claim 17, wherein the third percentage is less than the second percentage.

19. The oven of claim 17, wherein the plurality of gas flow inlets is arranged to permit the gas to flow upward into the food holding space from the gas supply plenum rearward portion.

20. The oven of claim 17, wherein the gas supply passageway underlies the gas supply plenum.

21. The oven of claim 17, wherein the food support surface bounds a bottom of the food holding space, wherein the bottom wall forward portion and the bottom wall rearward portion each form a portion of the food support surface, and wherein the gas supply plenum forward portion is below the food support surface and the gas supply plenum rearward portion is below the food support surface.

22. The oven of claim 17, wherein the gas supply duct extends below the food holding space.

23. The oven of claim 17, wherein the heater is in the gas supply duct and is arranged to heat the gas as the gas flows along the gas supply passageway.

24. The oven of claim 17, wherein the first and second side walls and the bottom wall bound the food holding space, and the bottom wall bounds the gas supply plenum.

25. The oven of claim 17, further comprising a gas intake spaced apart from the food holding space, the blower and the gas intake arranged relative to one another such that the blower draws the gas from an exterior environment surrounding the oven through the gas intake.

26. The oven of claim 17, wherein the blower, the food holding space, the gas supply plenum, the gas flow inlets, and the gas supply passageway are arranged relative to one another such that the gas blown by the blower flows through the gas supply passageway into the gas supply plenum forward portion, from the gas supply plenum forward portion into the gas supply plenum rearward portion, and from the gas supply plenum forward and rearward portions through the plurality of gas flow inlets into the food holding space.

27. The oven of claim 17, wherein
the plurality of gas flow inlets are arranged to permit gas to flow upward into the food holding space from the gas supply plenum forward portion.

28. The oven of claim 17, wherein the gas supply passageway has a cross-sectional flow area at the gas supply duct outlet, said cross-sectional flow area of the gas flow passageway at the gas supply duct outlet being less than a cross-sectional flow area of the gas supply plenum where the gas supply duct emits gas into the gas supply plenum forward portion.

29. The oven of claim 17, wherein a cross-sectional flow area of the gas supply plenum forward portion is greater than a cross-sectional flow area of the gas supply passageway.

30. The oven of claim 29, wherein a cross-sectional flow area of the gas supply passageway is substantially uniform or increases as the gas supply passageway extends along a length of the gas supply duct.

31. The oven of claim 29, wherein the gas supply plenum forward portion is below the bottom wall forward portion and the gas supply plenum rearward portion is below the bottom wall rearward portion.

32. The oven of claim 17, wherein the gas supply duct includes a gas supply duct rearward section below the gas supply plenum, and the blower blows gas generally forward along the gas supply passageway through the gas supply duct rearward section.

33. The oven of claim 17, wherein at least one of the gas supply duct or the bottom wall forward portion is configured to direct the gas rearward toward the bottom wall rearward portion when the gas enters the gas supply plenum.

\* \* \* \* \*